United States Patent
Lin

(10) Patent No.: US 10,110,311 B1
(45) Date of Patent: Oct. 23, 2018

(54) OPTICAL TRANSCEIVER

(71) Applicant: Prime World International Holdings Ltd., New Taipei (TW)

(72) Inventor: Huan-Yu Lin, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 15/722,279

(22) Filed: Oct. 2, 2017

(51) Int. Cl.
| | |
|---|---|
| *G02B 6/38* | (2006.01) |
| *G02B 6/36* | (2006.01) |
| *H04B 10/40* | (2013.01) |
| *H04B 10/69* | (2013.01) |
| *H01L 31/07* | (2012.01) |
| *H04Q 11/00* | (2006.01) |
| *H04J 14/02* | (2006.01) |
| *H04B 10/572* | (2013.01) |
| *G02B 6/02* | (2006.01) |
| *G02F 1/01* | (2006.01) |

(52) U.S. Cl.
CPC ......... *H04B 10/40* (2013.01); *G02B 6/02033* (2013.01); *G02B 6/38* (2013.01); *G02F 1/0121* (2013.01); *H01L 31/07* (2013.01); *H04B 10/572* (2013.01); *H04B 10/69* (2013.01); *H04J 14/02* (2013.01); *H04Q 11/0062* (2013.01)

(58) Field of Classification Search
CPC .. G02B 6/4249; G02B 6/3885; G02B 6/3893; G02B 6/43; G02B 6/387; G02B 6/4295; G02B 6/3604
USPC ............ 385/73, 81, 83, 87–89, 91, 137, 139
See application file for complete search history.

(56) References Cited

U.S. PATENT DOCUMENTS

| | | | | |
|---|---|---|---|---|
| 5,117,476 A | * | 5/1992 | Yingst ................. | G02B 6/4246 385/49 |
| 6,623,173 B1 | * | 9/2003 | Grois .................. | G02B 6/3878 385/76 |
| 6,945,712 B1 | * | 9/2005 | Conn .................. | G02B 6/3897 385/92 |
| 8,676,006 B2 | | 3/2014 | Morioka | |
| 8,787,714 B2 | | 7/2014 | Morioka | |
| 8,939,657 B2 | | 1/2015 | Hung | |
| 9,035,234 B2 | | 5/2015 | Wu | |
| 9,063,281 B2 | | 6/2015 | Lin | |

(Continued)

OTHER PUBLICATIONS

U.S. Office Action dated Apr. 9, 2018, received in related U.S. Appl. No. 15/791,987, 11 pgs.

(Continued)

*Primary Examiner* — Kaveh C Kianni
*Assistant Examiner* — Hung Lam
(74) *Attorney, Agent, or Firm* — Grossman Tucker Perreault & Pfleger, PLLC; Norman S. Kinsella

(57) ABSTRACT

An optical transceiver includes a substrate, a first transceiver module, a second transceiver module and an optical fiber module. The substrate defines an optical transceiver end. The first transceiver module and the second transceiver module are disposed on an outer surface of the substrate, and the first transceiver module is located between the optical transceiver end and the second transceiver module. The optical fiber module includes a first optical fiber and a second optical fiber. The first optical fiber is coupled to the first transceiver module, and the second optical fiber is coupled to the second transceiver module. A part of the second optical fiber is located above the first transceiver module.

9 Claims, 7 Drawing Sheets

(56) References Cited

U.S. PATENT DOCUMENTS

| | | |
|---|---|---|
| 9,134,487 B2 | 9/2015 | Chang et al. |
| 9,377,594 B2 | 6/2016 | Liff et al. |
| 2006/0164738 A1 | 7/2006 | Yamamoto et al. |
| 2011/0293221 A1* | 12/2011 | Kaneshiro ............ G02B 6/4201 385/49 |
| 2013/0266260 A1 | 10/2013 | Morioka et al. |
| 2014/0064662 A1 | 3/2014 | Ootorii |
| 2014/0151536 A1 | 6/2014 | Wu |
| 2014/0185995 A1 | 7/2014 | Lee et al. |
| 2017/0090125 A1 | 3/2017 | Kurashima et al. |
| 2017/0219786 A1 | 8/2017 | Morioka |

OTHER PUBLICATIONS

U.S. Office Action dated Jun. 29, 2018, received in related U.S. Appl. No. 15/724,621, 14 pp.

* cited by examiner

US 10,110,311 B1

OPTICAL TRANSCEIVER

TECHNICAL FIELD

The present disclosure relates to an optical transceiver, more particularly to a multi-channel optical transceiver.

BACKGROUND

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different specifications have been provided such as XFP (10 Gigabit Small Form Factor Pluggable) used in 10 GB/s communication rate and QSFP (Quad Small Form-factor Pluggable).

In order to transmit and receive optical signals over multiple channel wavelengths, multi-channel optical transceivers have been widely used in various applications. The types of the multi-channel optical transceivers, for example, include 2×2, 4×4 or 8×8 channels. Specifically, an 8×8 MIMO (Multi-input Multi-output) optical transceiver includes eight transmitters and eight receivers.

SUMMARY

According to one aspect of the present disclosure, an optical transceiver includes a substrate, a first transceiver module, a second transceiver module and an optical fiber module. The substrate defines an optical transceiver end. The first transceiver module and the second transceiver module are disposed on an outer surface of the substrate, and the first transceiver module is located between the optical transceiver end and the second transceiver module. The optical fiber module includes a first optical fiber and a second optical fiber. The first optical fiber is coupled to the first transceiver module, and the second optical fiber is coupled to the second transceiver module. A part of the second optical fiber is located above the first transceiver module.

According to another aspect of the present disclosure, an optical transceiver includes a substrate, two first transceiver modules and an optical fiber module. The two first transceiver modules are disposed on an outer surface of the substrate. The optical fiber module includes a first optical fiber and a second optical fiber. The first optical fiber and the second optical fiber are respectively coupled to the two first transceiver modules, and a part of the second optical fiber is located above one of the two first transceiver modules which the first optical fiber is coupled to.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

Figure 1A:
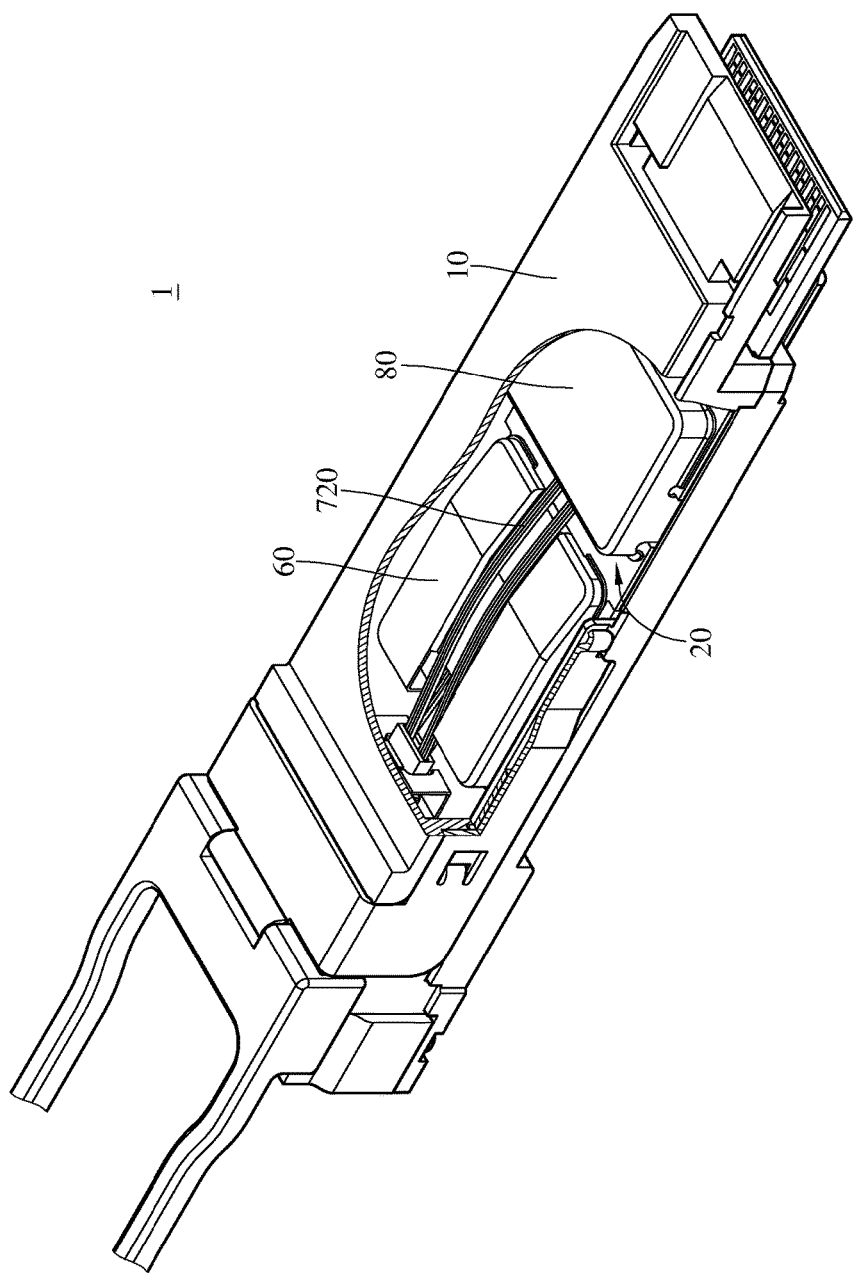
FIG. 1A is a perspective view of an optical transceiver according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
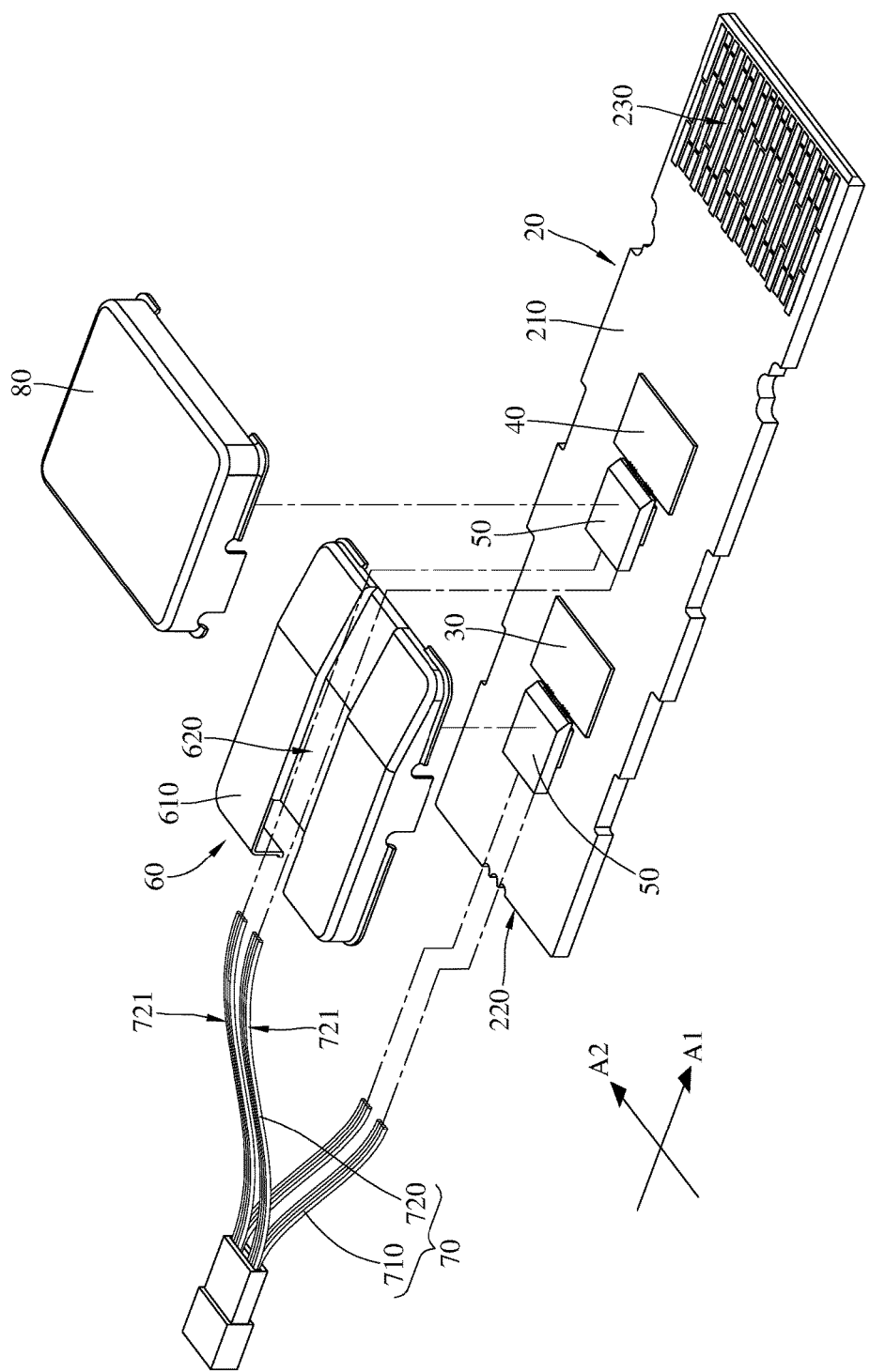
FIG. 1B is an exploded view of the optical transceiver in FIG. 1A.
Figure 1C:
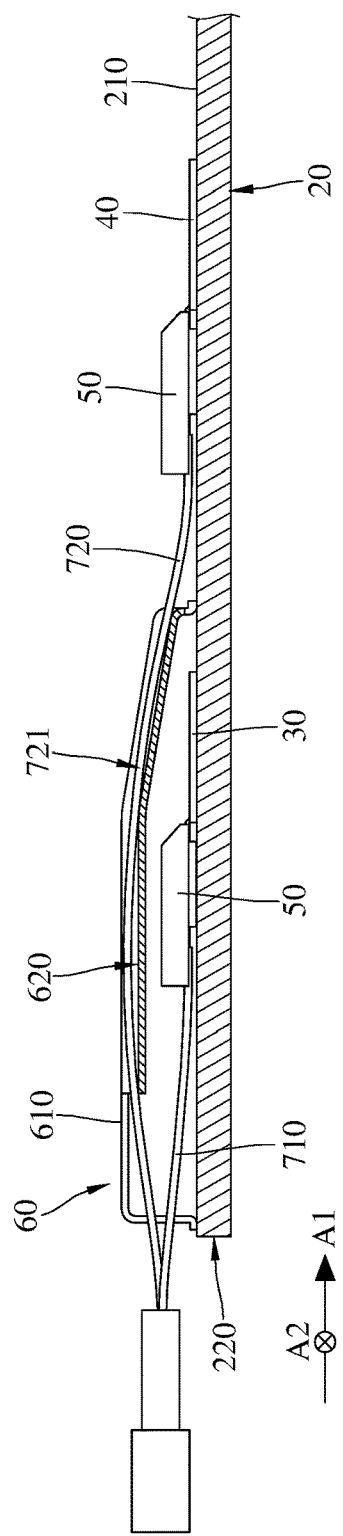
FIG. 1C is a cross-sectional view of the optical transceiver in FIG. 1A.

Please refer to FIG. 1A through FIG. 1C. FIG. 1A is a perspective view of an optical transceiver according to a first embodiment of the present disclosure. FIG. 1B is an exploded view of the optical transceiver in FIG. 1A. FIG. 1C is a cross-sectional view of the optical transceiver in FIG. 1A. In this embodiment, an optical transceiver 1 is disclosed. The disclosed optical transceiver 1 in this embodiment includes a case 10, a substrate 20, a first transceiver module 30, a second transceiver module 40, a second optical active assembly 50, two optical fiber arrays 50, a support 60, and an optical fiber module 70.

The case 10, for example, is made of metal. There is an optical connector (not shown) disposed on an end of the case 10 for coupling optical fibers to the optical transceiver 1. For the illustration purpose, however, the case 10 is omitted in FIG. 1B and FIG. 1C.

The substrate 20, for example, is a circuit board or a package substrate disposed within the case 10. The substrate 20 defines an outer surface 210, an optical transceiver end 220 and an electrical transceiver end 230. The optical transceiver end 220 and the electrical transceiver end 230 are opposite to each other, and the optical connector is disposed near the optical transceiver end 220.

The first transceiver module 30 and the second transceiver module 40 are disposed on the outer surface 210 of the substrate 20. The first transceiver module 30 is located between the optical transceiver end 220 of the substrate 20 and the second transceiver module 40. In detail, the first transceiver module 30 and the second transceiver module 40 are arranged along a direction A1 from the optical transceiver end 220 to the electrical transceiver end 230.

In this embodiment, each of the first transceiver module 30 and the second transceiver module 40 includes multiple electronic components and multiple active optical components which are physically separated from each other. The electronic components and the active optical components may be integrated into one single integrated circuit (IC) chip. The electronic components could be a pair of a driver IC chip and an amplifier IC chip. When the amplifier IC chip receives optical signals, the optical signals could be converted into electrical signals and transmitted into other systems through the electrical transceiver end 230. The electrical signals from electronic systems are received by the driver IC chip through the electrical transceiver end 230. The active optical components could be a pair of a laser diode coupled to the driver IC chip, and a P-I-N photodiode coupled to the amplifier IC chip. In another embodiment, each of the first transceiver module 30 and the second transceiver module 40 may include one electronic component and one active optical component. In this embodiment, such electronic component may be one IC chip and the active optical component may be a laser diode, a light emitting diode, a P-I-N photodiode or an avalanche photodiode. Furthermore, the active optical components of the first transceiver module 30 are located between the optical transceiver end 220 of the substrate 20 and the electronic components of the first transceiver module 30, and the active optical components of the second transceiver module 40 are located between the electronic components of the first transceiver module 30 and the electronic components of the second transceiver module 40.

The two optical fiber arrays 50 are disposed on the outer surface 210 of the substrate 20. One of the optical fiber arrays 50 is located between the optical transceiver end 220 and the first transceiver module 30 along the direction A1, and the other optical fiber array 50 is located between the first transceiver module 30 and the second transceiver module 40 along the same direction A1. Multiple V-grooves in each of the optical fiber arrays 50 are configured to support the optical fibers and place the optical fibers at a specific position.

The support 60 is disposed above the first transceiver module 30. In this embodiment, the support 60 is a covering structure disposed on the outer surface 210 of the substrate 20, and the covering structure defines a space allowing for the placement of the first transceiver module 30. The support 60 defines a top surface 610 and an accommodation groove 620 located on the top surface 610.

The optical fiber module 70 includes multiple first optical fibers 710 coupled to the first transceiver module 30 and multiple second optical fibers 720 coupled to the second transceiver module 40. The second optical fibers 720 in one embodiment of the present disclosure are placed on and supported by the V-grooves of the optical fiber array 50. The first optical fibers 710 on the other hand may go underneath the support 60 or share the same space defined by the support 60 with the first transceiver module 30.

In this embodiment, each first optical fiber 710 extends from the optical transceiver end 220 along the direction A1, and the portion of the first optical fiber 710 may be arranged above the first transceiver module 30. Each second optical fiber 720 extends from the optical transceiver end 220 along the direction A1 in the same embodiment. A terminal portion of the second optical fiber 720 may be located above the second transceiver module 40. Furthermore, each second optical fiber 720 may be with a crossing portion 721 located on, supported by, or even restrained by the accommodation groove 620, which may therefore allow for the crossing portion 721 to be located above the first transceiver module 30. As such, the top of each electronic component (IC chip) of the first transceiver module 30 could be properly spaced apart from the second optical fibers 720. In some embodiments, the first optical fibers 710 and the second optical fibers 720 of the optical fiber module 70 are jointly configured as a fiber pigtail.

Proper arrangement of the optical components and the electronic components is needed in the optical transceiver. In a conventional optical transceiver, the electronic components are usually arranged along the width of the substrate (for example, along a direction A2 in FIG. 1B). When the width of the optical transceivers is often limited in the corresponding specification, arranging the optical components and/or the electronic components in the aforementioned manner is disfavored. With the arrangement in the present disclosure, the second optical fiber 720 is prevented from contacting the first transceiver module 30 and the bonding wires at the periphery of the first transceiver module 30 and therefore damaging the same. Thus, the two transceiver modules 30 and 40 are able to be arranged along the direction A1 to further utilize the length of the optical transceiver 1 without being limited by the width of the same.

In this embodiment, the optical transceiver 1 further includes another covering structure 80 disposed on the outer surface 210 of the substrate 20, and the covering structure 80 may further define a space for the placement of the second transceiver module 40. Therefore, the covering structure 80 could be protecting the second transceiver module 40 and the bonding wires at the periphery thereof from the contact of the first optical fiber 710.

Moreover, in this embodiment, the crossing portions 721 of the second optical fibers 720 are located in the accommodation groove 620. Therefore, the second optical fibers 720 could be effectively separated from the first transceiver module 30. By placing the crossing portion 721 of the second optical fiber 720 in the accommodation groove 620, the height of the optical transceiver 1 may be reduced.

Figure 2A:
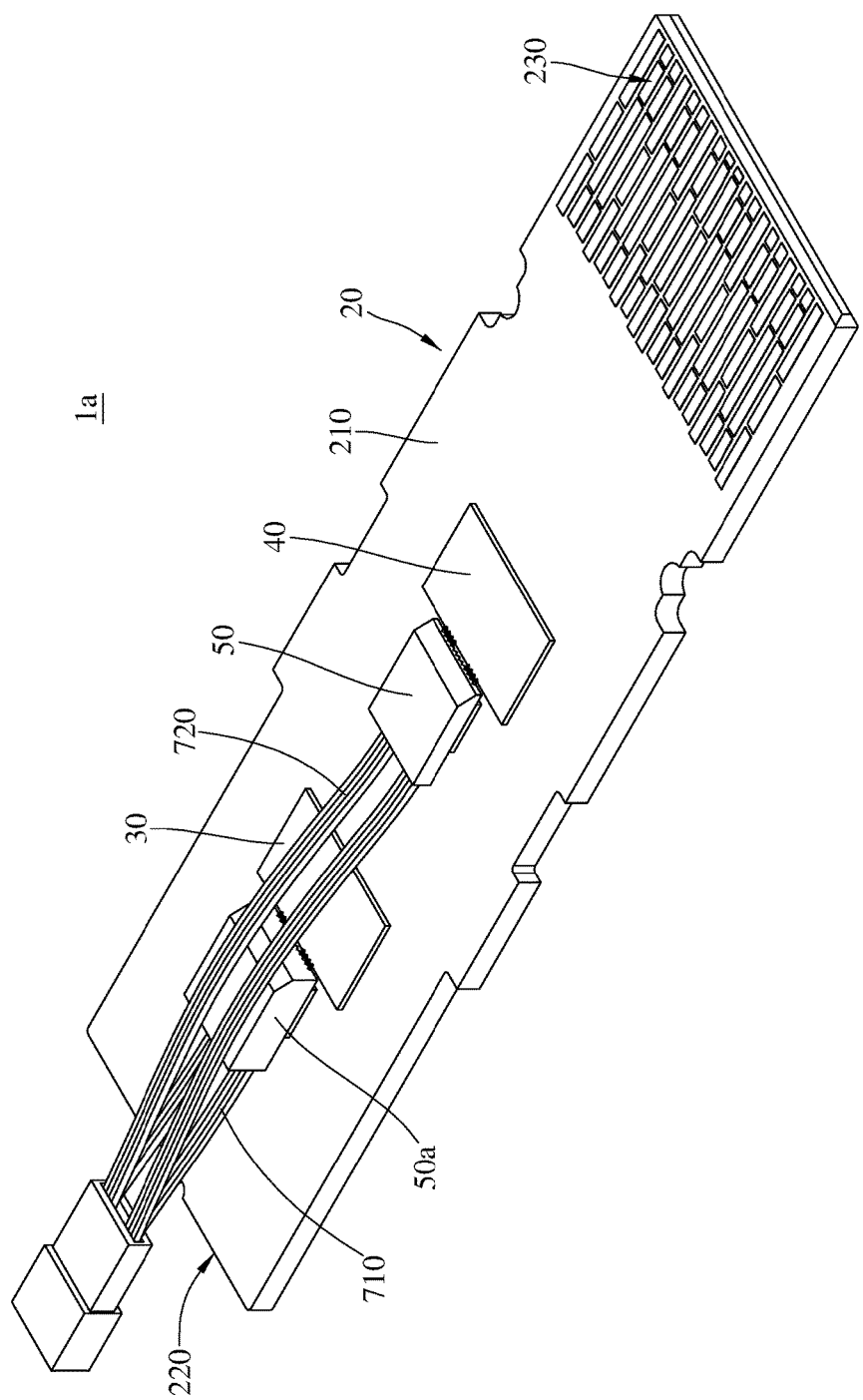
FIG. 2A is a perspective view of an optical transceiver according to a second embodiment of the present disclosure.
Figure 2B:
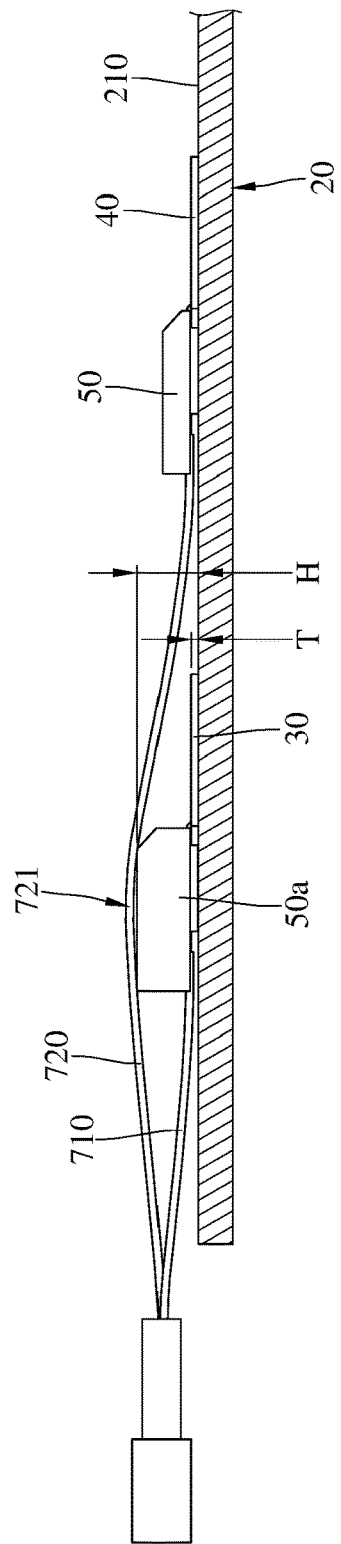
FIG. 2B is a cross-sectional view of the optical transceiver in FIG. 2A.

FIG. 2A is a perspective view of an optical transceiver according to a second embodiment of the present disclosure. FIG. 2B is a cross-sectional view of the optical transceiver in FIG. 2A. Since the second embodiment is similar to the first embodiment, only the differences will be illustrated hereafter. For the purpose of illustration, the case of the optical transceiver is omitted in FIG. 2A.

In this embodiment, an optical transceiver 1a is disclosed, and the optical transceiver 1a includes an optical fiber array 50a located between the optical transceiver end 220 and the first transceiver module 30. The optical fiber array 50a is configured as the support for the second optical fibers 720. The optical fiber array 50a may define a space allowing for the first optical fiber 710 to pass. The optical fiber array 50a may provide the support for the crossing portion 721 of the second optical fiber 720 when the second optical fiber 720 crosses over the outer surface 210 of the substrate 20.

Furthermore, the height H of the optical fiber array 50a is larger than the thickness T of the first transceiver module 30 in this embodiment. Therefore, the second optical fibers 720 may not contact the first transceiver module 30 and the bonding wires at the periphery thereof.

Figure 3:
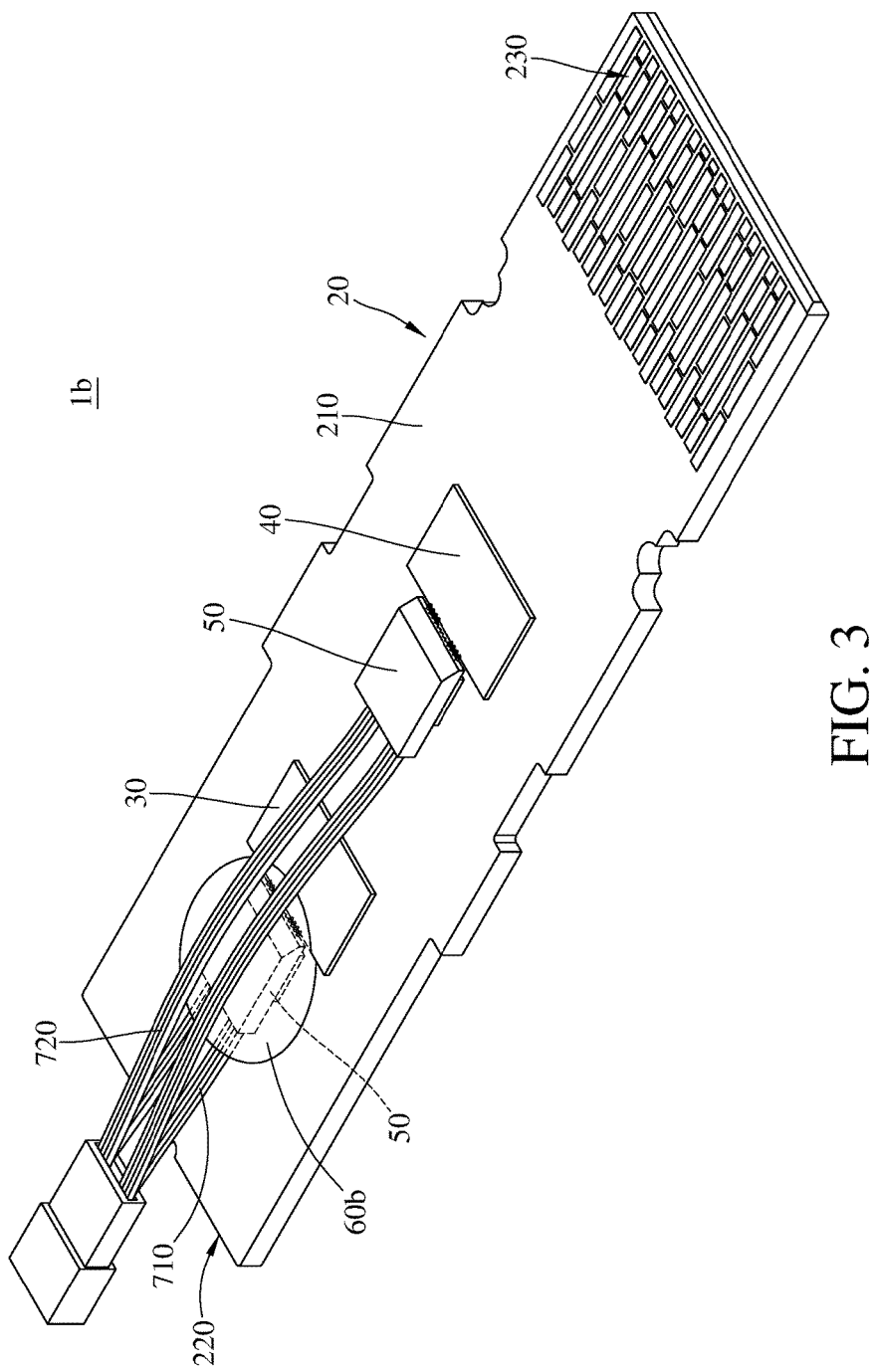
FIG. 3 is a perspective view of an optical transceiver according to a third embodiment of the present disclosure.

FIG. 3 is a perspective view of an optical transceiver according to a third embodiment of the present disclosure. Since the third embodiment is similar to the first embodiment, only the differences will be illustrated hereafter. For the purpose of illustration, the case of the optical transceiver is omitted in FIG. 3.

In this embodiment, an optical transceiver 1b is disclosed, and the optical transceiver 1b includes a solidified adhesive 60b disposed on the outer surface 210 of the substrate 20. The solidified adhesive 60b, for example, is a lump of epoxy resin, UV glue or instant glue configured as the support for the second optical fibers 720. The solidified adhesive 60b covers the first transceiver module 30 and the optical fiber array 50 where the first optical fibers 710 are disposed. The crossing portion 721 of the second optical fiber 720 crosses the solidified adhesive 60b, with the solidified adhesive 60b providing the support for the crossing portion 721. Furthermore, the height of the solidified adhesive 60b is larger than the thickness of the first transceiver module 30 in this embodiment.

The solidified adhesive 60b covers a part of first transceiver module 30, while exposes another part of the first transceiver module 30 in this embodiment, but the present disclosure is not limited thereto. In other embodiments, the solidified adhesive 60b entirely covers the first transceiver module 30.

Figure 4:
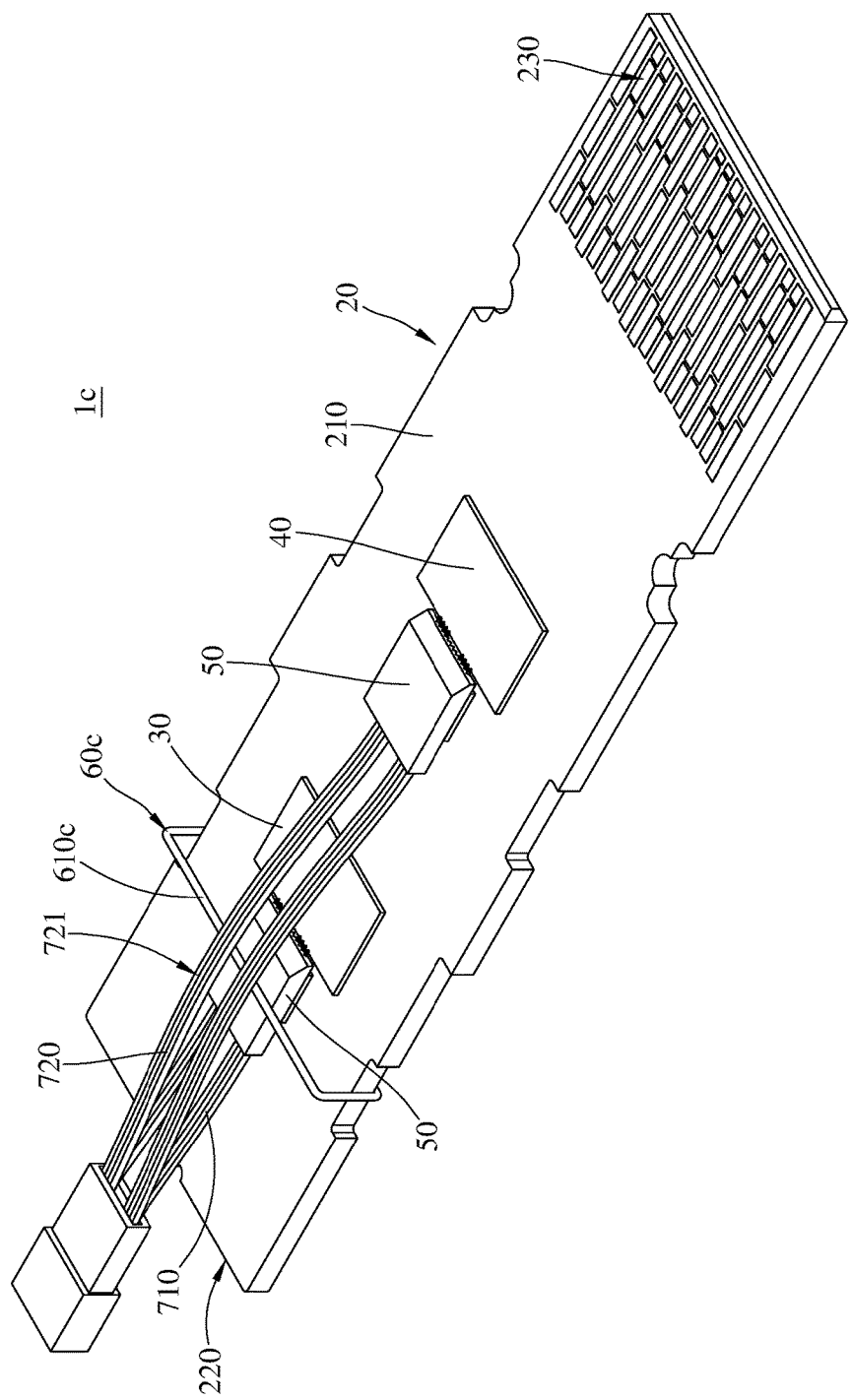
FIG. 4 is a perspective view of an optical transceiver according to a fourth embodiment of the present disclosure.

FIG. 4 is a perspective view of an optical transceiver according to a fourth embodiment of the present disclosure. Since the fourth embodiment is similar to the first embodiment, only the differences will be illustrated hereafter. For the purpose of illustration, the case of the optical transceiver is omitted in FIG. 4.

In this embodiment, an optical transceiver 1c is disclosed, and the optical transceiver 1c includes a frame 60c disposed on the outer surface 210 of the substrate 20. The frame 60c, for example, is made of metal, plastic or glass. A crossbeam 610c of the frame 60c is located above the first transceiver module 30, and the frame 60c is configured as the support for the second optical fibers 720. The crossing portion 721 of the second optical fiber 720 crosses the frame 60c, with the crossbeam 610c providing the support for the crossing portion 721. Furthermore, a distance between the crossbeam 610c and the outer surface 210 is larger than the thickness of the first transceiver module 30 in this embodiment.

According to the present disclosure, a part of the second optical fiber is supported by the support so as to be located above the first transceiver module. Therefore, the second optical fiber is prevented from damaging the first transceiver module, and the bonding wires at the periphery of the first transceiver module.

The embodiments are chosen and described in order to best explain the principles of the present disclosure and its practical applications, to thereby enable others skilled in the art to best utilize the present disclosure and various embodiments with various modifications as are suited to the particular use that is being contemplated. It is intended that the scope of the present disclosure is defined by the following claims and their equivalents.

What is claimed is:

1. An optical transceiver, comprising:
   a substrate defining an optical transceiver end;
   a first transceiver module disposed on an outer surface of the substrate;
   a second transceiver module disposed on the outer surface of the substrate, and the first transceiver module being located between the optical transceiver end and the second transceiver module;
   an optical fiber module comprising a first optical fiber and a second optical fiber, the first optical fiber being coupled to the first transceiver module, the second optical fiber being coupled to the second transceiver module, and a part of the second optical fiber being located above the first transceiver module;
   a support disposed above the first transceiver module, wherein a crossing portion of the second optical fiber is supported by the support, and the crossing portion is located above the first transceiver module;
   wherein the support is a covering structure disposed on the outer surface of the substrate, the covering structure defines a space for the placement of the first transceiver module, the crossing portion of the second optical fiber crosses the covering structure, and the crossing portion is supported by the covering structure; and
   wherein the covering structure defines a top surface and an accommodation groove on the top surface, and the crossing portion of the second optical fiber is disposed in the accommodation groove.

2. The optical transceiver according to claim 1, wherein the second optical fiber is spaced apart from top of the first transceiver module.

3. The optical transceiver according to claim 1, wherein the support is an optical fiber array disposed on the outer surface of the substrate, the optical fiber array is located between the optical transceiver end and the first transceiver module, and the optical fiber array defines a space allowing for the first optical fiber to pass.

4. The optical transceiver according to claim 3, wherein a height of the optical fiber array is larger than a thickness of the first transceiver module.

5. The optical transceiver according to claim 1, wherein the support is a solidified adhesive disposed on the outer surface of the substrate, the solidified adhesive covers the first transceiver module, and the crossing portion of the second optical fiber crosses the solidified adhesive with the solidified adhesive supporting the crossing portion of the second optical fiber.

6. The optical transceiver according to claim 1, wherein both the first optical fiber and the second optical fiber extends along a direction from the optical transceiver end to the second transceiver module.

7. The optical transceiver according to claim 1, further comprising a covering structure disposed on the outer surface of the substrate, wherein the covering structure defines a space allowing for the placement of the second transceiver module.

8. The optical transceiver according to claim 1, wherein the optical fiber module is a fiber pigtail.

9. An optical transceiver, comprising:
   a substrate;
   two transceiver modules disposed on an outer surface of the substrate;
   an optical fiber module comprising a first optical fiber and a second optical fiber, the first optical fiber and the second optical fiber being respectively coupled to the two transceiver modules, and a part of the second optical fiber being located above one of the two transceiver modules which the first optical fiber is coupled to;
   a support disposed above one of the two transceiver modules, wherein a crossing portion of the second optical fiber is supported by the support; and
   wherein the support defines a top surface and an accommodation groove on the top surface, and the crossing portion of the second optical fiber is disposed in the accommodation groove.

* * * * *